United States Patent [19]
Chen et al.

[11] Patent Number: 6,002,586
[45] Date of Patent: Dec. 14, 1999

[54] APPARATUS FOR ADJUSTABLE MOUNTING A COOLING DEVICE TO A COMPUTER ENCLOSURE

[75] Inventors: I-Fee Chen, Chung-Li; Alvin Liu, Taipei Hsien; Chung-Jung Sun, Kee-Lung, all of Taiwan

[73] Assignee: Hon Hai Precision Ind. Co., Ltd., Taipei Hsien, Taiwan

[21] Appl. No.: 09/172,736

[22] Filed: Oct. 13, 1998

[30] Foreign Application Priority Data

Jan. 21, 1998 [TW] Taiwan .................................. 87201265

[51] Int. Cl.$^6$ ......................................................... H05K 7/20
[52] U.S. Cl. ........................... 361/695; 361/683; 361/717; 361/725; 361/736; 361/753; 361/796; 174/16.1; 312/223.2; 211/41.17; 454/184
[58] Field of Search ..................................... 361/683, 685, 361/690–697, 687, 736, 682, 725, 796, 141, 753, 717; 454/184; 307/53; 415/213.1; 16/261; 439/160; 312/223.2; 174/16.1; 211/175, 41.17

[56] References Cited

U.S. PATENT DOCUMENTS

| | | | |
|---|---|---|---|
| 5,079,438 | 1/1992 | Heung | 361/384 |
| 5,186,605 | 2/1993 | Tracy | 415/119 |
| 5,448,495 | 9/1995 | Liu | 361/683 |

*Primary Examiner*—Leo P. Picard
*Assistant Examiner*—Michael Datskovsky

[57] ABSTRACT

An apparatus for adjustably mounting a cooling device, such as a fan, to a computer enclosure comprises a saddle and a bracket. The saddle for mounting the fan thereto has opposite longitudinal skirts with locating slots defined therein. The bracket has a first portion attached to a wall of the computer enclosure and a second portion for mounting an assembly of the saddle and the fan thereto. The assembly of the saddle and the fan is slidably mounted to the second portion of the bracket for adjustably locating at a position corresponding to a CPU of a mother board.

38 Claims, 5 Drawing Sheets

APPARATUS FOR ADJUSTABLE MOUNTING A COOLING DEVICE TO A COMPUTER ENCLOSURE

BACKGROUND OF THE INVENTION

1. Field of The Invention

The present invention relates to an apparatus for adjustably mounting a cooling device to a computer enclosure and, more particularly, to a bracket fixed onto a wall of the computer enclosure for slidably mounting a cooling device, such as a fan, thereon, whereby, the fan can slide back and forth to a specified position corresponding to the CPU's location on a mother board and direct cool air to flow toward the CPU for dissipating heat generated thereby.

2. The Related Art

Heat dissipation and ventilation are two important issues of computer system design. If the heat in a computer system can not be properly and quickly transferred out of the enclosure, the computer system will malfunction resulting in serious damage. The conventional method for heat dissipation of a computer system is to mount a heat sink or a cooler onto the CPU, the main source of heat within the computer system, and increase the number of fans for facilitating air flow in the interior of the computer enclosure.

A conventional heat sink mounted to a surface of a CPU is a passive heat convection apparatus. Due to the contacting engagement between the heat sink and the CPU, heat will conduct from the CPU to the heat sink and dissipate from fins of the heat sink. The fan of a switching power supply draws the air flow from the interior of the enclosure toward an exterior thereof. Thus, heat generated by the CPU or other heat generating devices is transferred out of the enclosure. As computer technology progresses, heat generated by newer computer systems with a PentiumII CPU may be ten times that of systems with a 386 or 486 CPU. Therefore, it is understood that a conventional heat sink is not enough to resolve this issue.

To overcome the limitation described above, a small fan directly mounted to a top portion of a heat sink increases air flow through the fins therebeneath. The assembly of the small fan and the heat sink, referred to as a "cooler", is an active heat convection apparatus for dissipating the heat more effectively than conventional passive heat sinks. Sometimes such coolers force the dissipated heat in the interior of the enclosure even closer to the CPU. Therefore, the misdirected heat adversely affects the function of the computer system which defeats the purpose of such a cooler. The most important defect of the cooler is that the small and precise fan is positioned too close to the CPU and is adversely affected by the high temperature of the CPU which reduces the life span of the fan. This defect induces malfunction of the CPU which disable the computer.

Some computers are designed with an additional fan directly mounted to a front wall of the enclosure to direct the air flow toward the switching power supply which draws the air flow out of a rear side thereof. Thus, a circulation of air flow to improve the ventilation of the computer system is created. Since a computer enclosure may contain several different types of mother boards, a hidden corner may exist which may obstruct the cool outside air from completely flowing through the CPU. Therefore, the heat generated from the CPU is retained within the inner space of the enclosure. To concentrate the air flow toward the CPU, an air flow guiding apparatus is mounted to the enclosure. The air flow guiding apparatus is fitted to one specific mother board, thus, if the mother board is changed, a new guiding apparatus must be designed and manufactured. The related prior published patents are U.S. Pat. Nos. 4,712,159, 4,890,196, 5,208,731, 5,276,585, 5,486,980, and 5,502,619.

Due to the limitations of the above designs, an improved apparatus is required which is adjustably mounted to a position corresponding to the location of the CPU on the mother board not only for dissipating the heat generated by the CPU but also for facilitating adequate ventilation within the computer system.

SUMMARY OF THE INVENTION

In view of the foregoing, an object of the present invention is to provide an apparatus for facilitating the mounting of a cooling device to a computer enclosure.

Another object of the present invention is to provide an apparatus for adjustably locating a cooling device at a corresponding position whereby air flow is directed toward the CPU.

Another object of the present invention is to provide an apparatus for facilitating adequate ventilation within a computer enclosure thereby allowing the computer system to achieve the best possible performance.

A further object of the present invention is to provide an apparatus for drawing air outside the computer enclosure thereinto and directing the air flow toward the CPU or other heat generating components on a mother board.

To achieve the above objects, an apparatus for adjustably mounting a cooling device in a computer enclosure and locating the cooling device at a proper position, comprises a bracket having a first portion for mounting the bracket to a wall of the computer enclosure and a second portion for mounting the cooling device, such as a fan, and a saddle slidably mounting to the second portion of the bracket and having the fan attached thereto. Therefore, the fan can be adjustably positioned at a corresponding space near the CPU, whereby the air flow is directed toward the CPU and heat generated by the CPU is transferred out of the enclosure. Furthermore, the fan combined with a additional fan of a switching power supply facilitates adequate ventilation of the whole computer enclosure for ensuring efficient performance of the computer system.

DETAILED DESCRIPTION OF THE PREFERRED EMBODIMENTS

Figure 1:
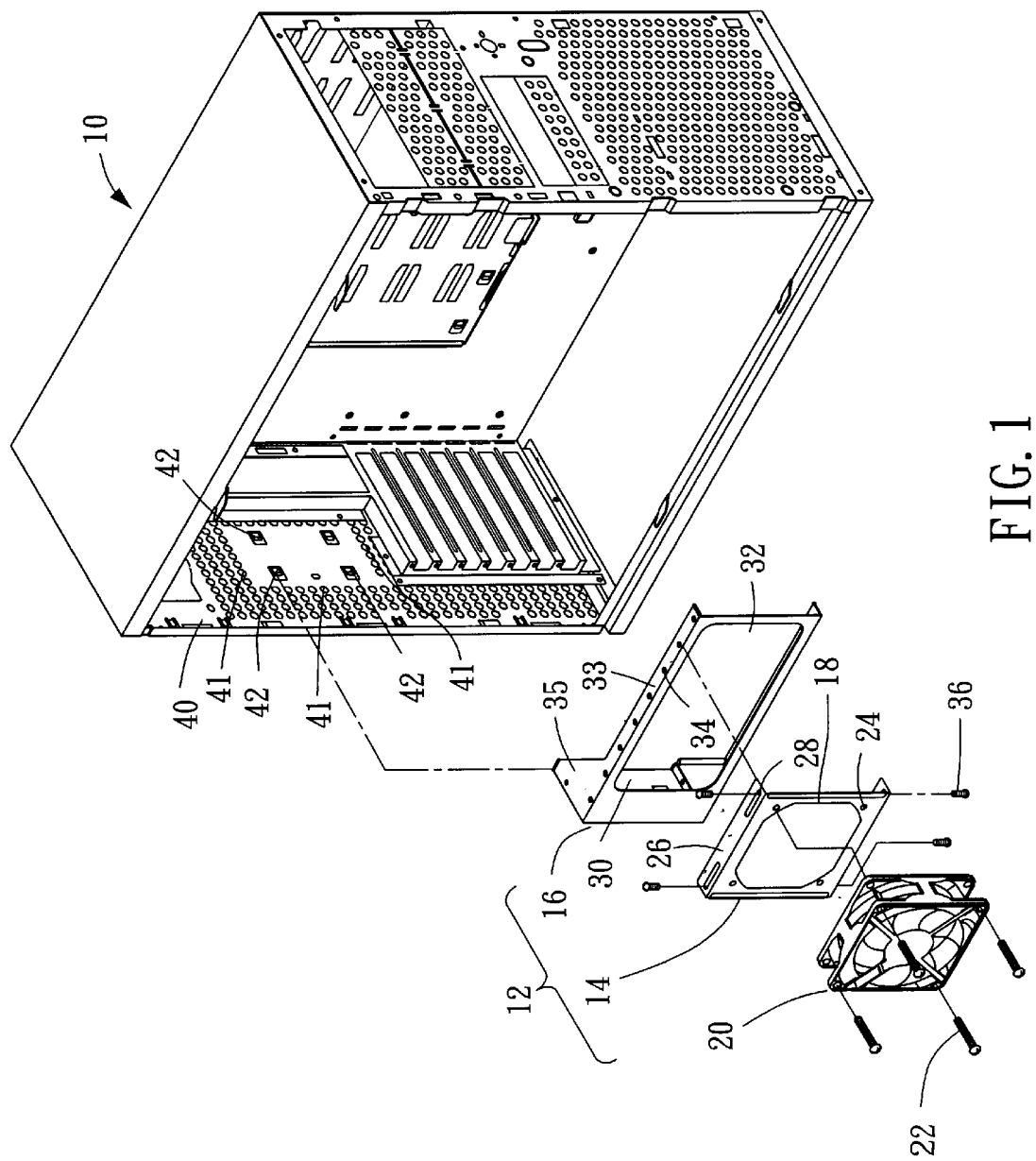
FIG. 1 is an exploded view of a preferred embodiment of an apparatus for locating and mounting a fan on a computer enclosure in accordance with the present invention.

Referring to FIG. 1, an apparatus 12 for adjustably mounting a cooling device, such as a fan 20, to a computer enclosure 10 comprises a rectangular saddle 14 and a bracket 16. The saddle 14 defines an opening 18 in a central portion thereof for fixing the fan 20 thereto by means of screws 22 extending through corresponding holes 24. The saddle 14 forms skirts 26 along two opposite longitudinal sides thereof, respectively. Each skirt 26 further defines two locating slots 28 therein.

Figure 2:
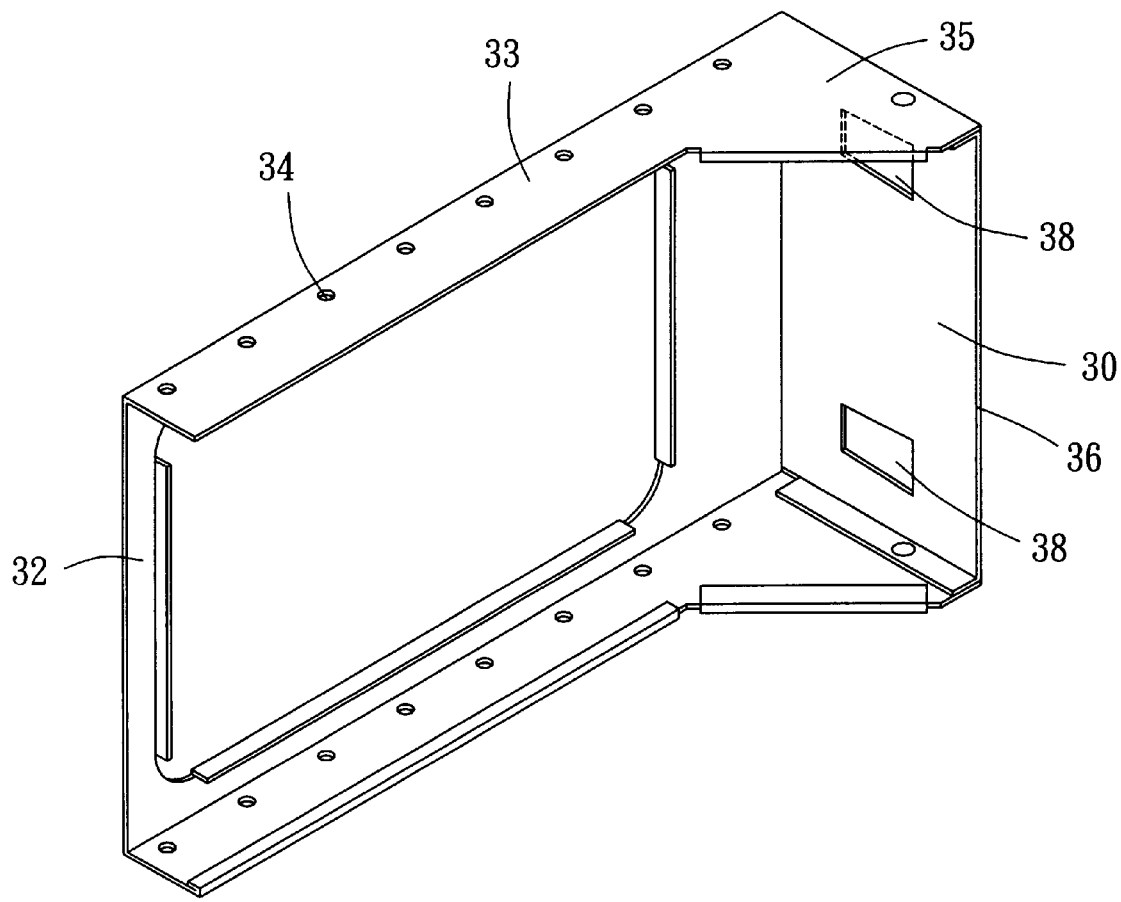
FIG. 2 is a perspective view of the preferred embodiment of a bracket in accordance with the present invention.

Also referring to FIG. 2, the bracket 16 comprises a first portion 30 and a second portion 32 perpendicular to the first portion 30. The second portion 32 of the bracket 16 forms a pair of side plates 33 along two opposite longitudinal sides thereof, respectively, and each side plate 33 defines several locating holes 34 therein. The saddle 14 along with the fan 20 can be slidably mounted to the second portion 32 of the bracket 16 for adjusting to a proper position corresponding to the position of a CPU on a mother board (not shown). By aligning the locating slots 28 with the locating holes 34, screws 36 can extend through the corresponding slots 28 to engage with the holes 34 for fixing the saddle 14 at the proper position. A triangular wall 35 joins the first portion 30 to the second portion 32 thereby forming a rigid structure. A rear panel 40 of the enclosure 10 forms tabs 42 thereon for engaging with an edge 36 and two corresponding openings 38 of the first portion 30 of the bracket 16. Therefore, the first portion 30 is attached to the rear panel 40 and the bracket 16 can be mounted to the enclosure 10. The rear panel 40 defines a plurality of through holes 41 therein near the first portion 30 attachment area, therefore air outside the enclosure 10 will be drawn thereinto.

Figure 3:
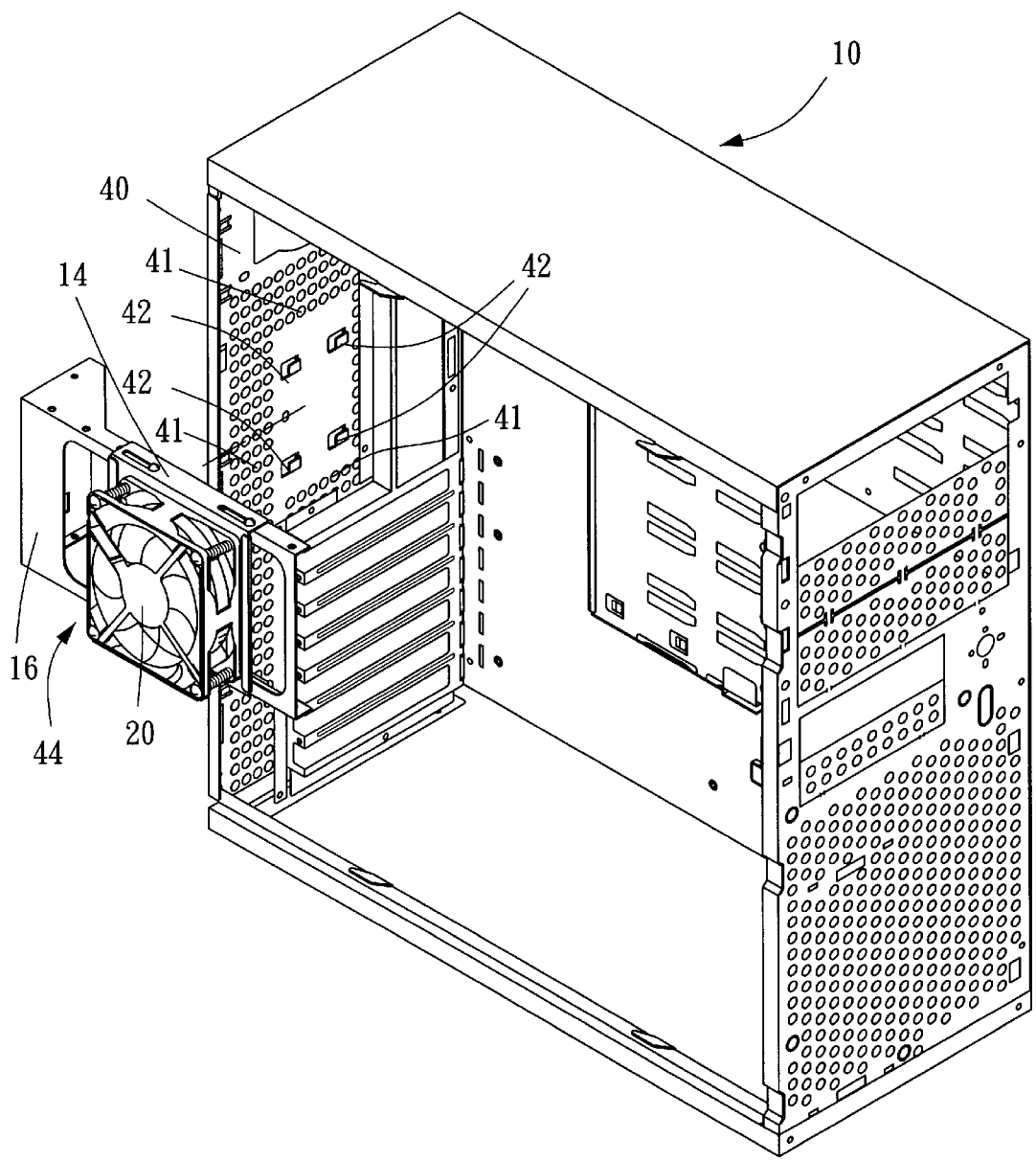
FIG. 3 is another exploded view of the preferred embodiment of the present invention showing a saddle together with the fan mounted to the bracket.
Figure 4:
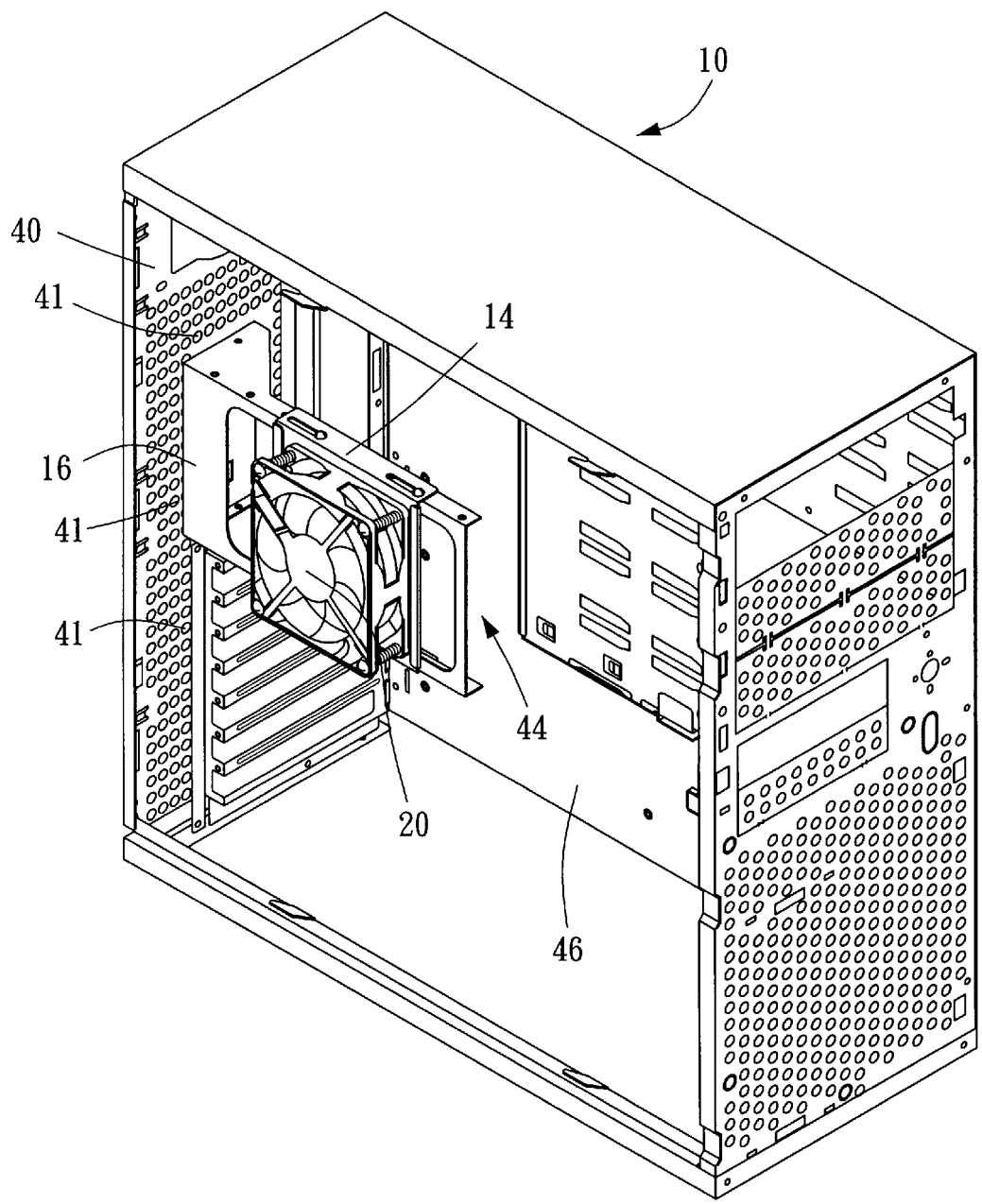
FIG. 4 is another exploded view of the preferred embodiment of the present invention showing the bracket mounted to a wall of the computer enclosure.
Figure 5:
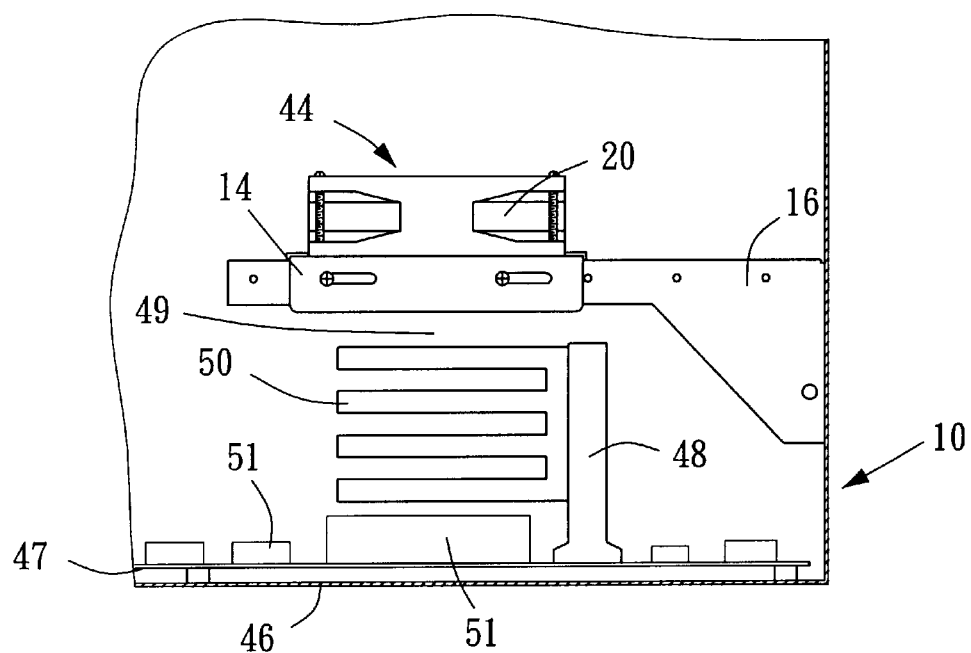
FIG. 5 is a cross-sectional side view of the preferred embodiment in accordance with the present invention showing a first type mother board mounted to the enclosure and the fan located at a corresponding first position.

Referring to FIG. 3, an assembly 44 comprising the fan 20 and the saddle 14, and the bracket 16 are combined before attaching to the computer enclosure 10. As shown in FIG. 4, the assembly 44 is mounted onto the rear panel 40 and the fan 20 is directed toward a tray 46 used for mounting a mother board (not shown) thereto. Also referring to FIG. 5, the assembly 44 is mounted to the enclosure 10 which includes a mother board 47 with a PentiumII CPU 48 mounted to the tray 46. The CPU 48 conducts heat to a heat sink 50, a passive heat convection apparatus, and the fan 20 is located above the CPU 48 and the heat sink 50. For facilitating the air flowing, a space 49 is defined between the assembly 44 and the assembly of the CPU 48 and the heat sink 50. Therefore, the fan 20 draws the air from outside the enclosure 10 through the through holes 41 and directs the flow of air toward the CPU 48 and the heat sink 50 to carry the heat away. Cooperating with an additional fan of a switching power supply (not shown), the fan 20 not only facilitates heat dissipation of the CPU 48 but also improves ventilation of the whole the computer system. The fan 20 mounted to the saddle 14 is larger than the conventional small cooler previously described and can direct more cool air toward the CPU 48 and other adjacent components 51 on the mother board 47. The fan 20 of the present invention is easy to manufacture and costs less than the small, precise fan of the conventional cooler. Compared with the conventional heat sink, the present invention exhibits active convection features.

Figure 6:
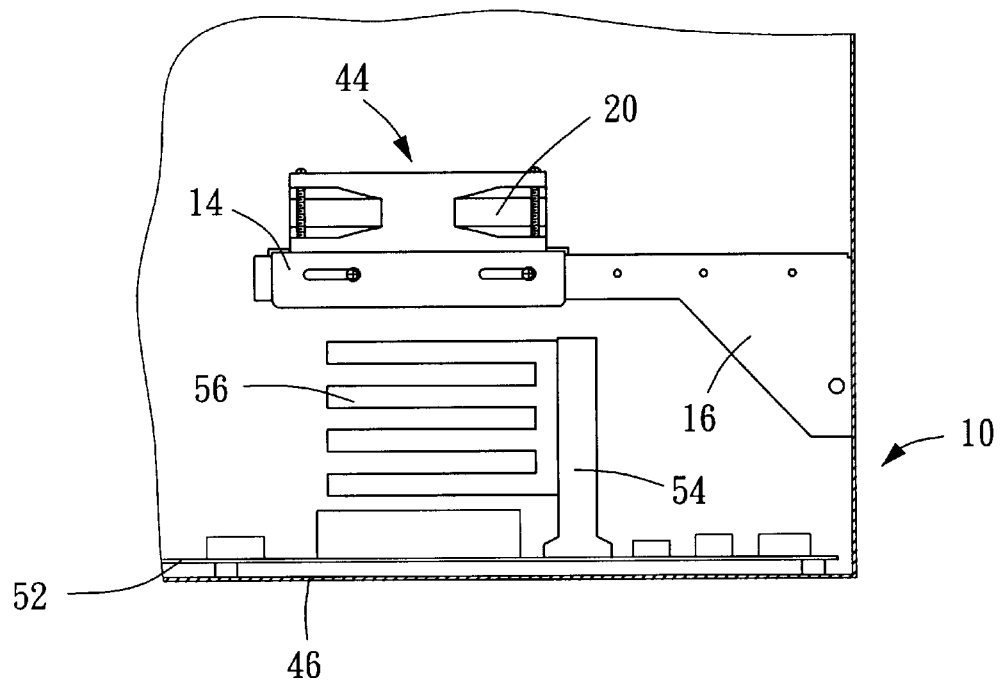
FIG. 6 is a cross-sectional side view of the preferred embodiment in accordance with the present invention showing a second type mother board mounted to the enclosure and the fan located at a corresponding second position.

Generally speaking, each mother board has a specified printed circuit layout even under the same standard specification. FIG. 6 includes a mother board 52 which is different from the mother board 47 shown in FIG. 5. A CPU 54 with a heat sink 56 attached thereto is located at a specified position on the mother board 52. The assembly 44 is slidably and adjustably mounted onto the bracket 16 by means of the saddle 14 whereby the appropriate position above the CPU 54 and the heat sink 56 can be achieved. Therefore, the assembly 44 can be adapted to different mother board types for adequately cooling and ventilating the whole computer system.

While the present invention has been described in reference to a specific embodiment, the description is illustrative of the invention and is not to be construed as limiting the invention. various modifications to the present invention can be made to the preferred embodiment by those skilled in the art without departing from the true spirit and scope of the invention as defined by the appended claims.

Therefore, persons of ordinary skill in this field are to understand that all such equivalent structures are to be included within the scope of the following claims.

We claim:

1. An apparatus for mounting a cooling device to a computer enclosure facing toward a mother board, comprising:

a first portion attached to a wall of said computer enclosure; and a second portion parallel to said mother board and defining a means for slidably mounting said cooling device thereto;

whereby said cooling device can direct air to at least a component mounted on said mother board and enclosed within said computer enclosure for dispersing heat generated thereby.

2. The apparatus as described in claim 1, wherein said first portion and said second portion are perpendicular to each other.

3. The apparatus as described in claim 1, wherein said cooling device is a fan assembly.

4. The apparatus as described in claim 3, wherein said fan assembly includes a fan and a saddle for mounting said fan thereto, wherein said saddle forming skirts crosses over and is mounted to said second portion.

5. The apparatus as described in claim 4, wherein said saddle is sildably mounted to said second portion.

6. An apparatus for adjustably mounting a cooling device to a computer enclosure, comprising:

a saddle for mounting said cooling device thereto; and a bracket having a first portion attached to a wall of said computer enclosure and a second portion for slidably mounting said saddle thereto;

whereby said cooling device can be located at a specified position and direct air flow to components of a mother board and disperse heat generated thereby.

7. The apparatus as described in claim 6, wherein said first portion and said second portion of said bracket are perpendicular to each other.

8. The apparatus as described in claim 6, wherein said cooling device is a fan.

9. The apparatus as described in claim 6, wherein said saddle is rectangular and forms skirts along opposite longitudinal sides thereof, and said second portion of said bracket has side plates.

10. The apparatus as described in claim 9, wherein said skirts define a plurality of first locating holes and said side plates define a plurality of second locating holes.

11. The apparatus as described in claim 10, wherein said first locating holes are aligned with said second locating holes and screws extend therethrough for fixing and locating said saddle on said bracket.

12. The apparatus as described in claim 6, wherein said wall of said enclosure has tabs for engaging with either corresponding openings or an edge of said first portion of said apparatus.

13. An apparatus for mounting a cooling device with a saddle to a computer enclosure, comprising:

a first portion mounted to said computer enclosure; and a second portion having said saddle of said cooling device slidably mounted thereto;

whereby a space is defined between said cooling device and said components enclosed within said computer enclosure for facilitating air flow, said cooling device directing air flow toward said components and dispersing heat generated thereby.

14. The apparatus as described in claim 13, wherein said first portion and said second portion of said bracket are perpendicular to each other.

15. The apparatus as described in claim 13, wherein said device is a fan.

16. The apparatus as described in claim 13, wherein said saddle is slidably mounted to said second portion.

17. The apparatus as described in claim 16, wherein said saddle is rectangular and forms skirts along opposite longitudinal sides thereof, and said second portion of said bracket has side plates.

18. The apparatus as described in claim 17, wherein said skirts define a plurality of first locating holes and said side plates define a plurality of second locating holes.

19. The apparatus as described in claim 18, wherein said first holes are aligned with said second holes and screws extend therethrough for adjustably fixing and locating said saddle on said bracket.

20. The apparatus as described in claim 19, wherein said wall of said enclosure has tabs for engaging with either corresponding openings or an edge of said first portion of said apparatus.

21. An apparatus for mounting a fan assembly including a fan and a saddle for mounting said fan thereto to a computer enclosure toward a mother board, comprising:

a first portion mounted to said computer enclosure; and a second portion for slidably mounting said saddle of said fan assembly thereto;

wherein said computer enclosure has at least one through hole whereby said fan assembly directs air from outside said enclosure, through said through hole, toward components mounted onto said mother board and dispersing heat generated thereby.

22. The apparatus as described in claim 21, wherein said saddle is rectangular and forms skirts along opposite longitudinal sides thereof, and said second portion of said bracket has side plates.

23. The apparatus as described in claim 22, wherein said skirts define a plurality of first locating holes and said side plates define a plurality of second locating holes.

24. The apparatus as described in claim 23, wherein said first holes are aligned with said second holes and screws extend therethrough for adjustably fixing and locating said saddle on said bracket.

25. The apparatus as described in claim 24, wherein said wall of said enclosure has tabs for engaging with either corresponding openings or an edge of said first portion of said apparatus.

26. The apparatus as described in claim 21, wherein said through hole is positioned near a first portion mounting area in said computer enclosure.

27. An apparatus for mounting a cooling device to a computer enclosure, comprising:

a bracket fixedly mounted to a wall of said computer enclosure, having a plurality of holes;

said cooling device having a plurality of slots, whereby the cooling device is selectively retained at different positions with regard to the bracket by means of cooperation between said holes and said slots.

28. The apparatus as described in claim 27, wherein said bracket includes a first portion and a second portion in which the holes are defined.

29. The apparatus as described in claim 28, wherein said first portion and said second portion are perpendicular to each other.

30. The apparatus as described in claim 27, wherein said cooling device is a fan assembly.

31. The apparatus as described in claim 30, wherein said fan assembly includes a fan and a saddle for mounting said fan thereto.

32. The apparatus as described in claim 31, wherein said saddle is sildably mounted to said bracket.

33. An apparatus for adjustably mounting a cooling device to a computer enclosure, comprising:

a saddle for mounting said cooling device thereto; and a bracket having a first portion attached to a wall of said computer enclosure and a second portion for slidably mounting said saddle thereto, thereby said cooling device being able to be located at a specified position and direct air flow to components of a mother board and disperse heat generated thereabouts; wherein said saddle is rectangular and forms skirts along opposite longitudinal sides thereof, and said second portion of said bracket has side plates.

34. An apparatus for adjustably mounting a cooling device to a computer enclosure, comprising:

a saddle for mounting said cooling device thereto; and a bracket having a first portion attached to a wall of said computer enclosure and a second portion for slidably mounting said saddle thereto, thereby said cooling device being able to be located at a specified position and direct air flow to components of a mother board and disperse heat generated thereabouts; wherein said wall of said enclosure has tabs for engaging with either corresponding openings or an edge of said first portion of said apparatus.

35. An apparatus for mounting a cooling device to a computer enclosure, comprising:

a first portion mounted to said computer enclosure; and a second portion for mounting said cooling device thereto, thereby a space being defined between said cooling device and said components enclosed within the computer enclosure, which is for facilitating the air flowing, and said cooling device being able to direct air flow to said components and disperse heat generated thereabouts;

said cooling device including a fan and a saddle slidably mounted to said second portion for mounting said fan thereto, said saddle being rectangular and forming skirts along opposite longitudinal sides thereof, and said second portion of said bracket having side plates.

36. An apparatus for mounting a cooling device to a computer enclosure, comprising:

a first portion mounted to said computer enclosure; and a second portion for mounting said cooling device thereto, thereby said computer enclosure including at least one through hole, so that the cooling device can direct air from outside said enclosure, through said through hole, flowing toward said components and dispersing heat generated thereabouts;

said cooling device including a fan and a saddle slidably mounted to said second portion for mounting said fan thereto; and said saddle being rectangular and forming skirts along opposite longitudinal sides thereof, and said second portion of said bracket including side plates.

37. An apparatus for mounting a cooling device to a computer enclosure, comprising:
- a bracket fixedly mounted to a wall of said computer enclosure, having a first adjusting means;
- said cooling device having a second adjusting means thereby the cooling device being selectively retained at different positions with regard to the bracket by means of the cooperation of said first adjusting means and said second adjusting means; wherein
- said first adjusting means includes a plurality of holes and a pair of screws.

38. An apparatus for mounting a cooling device to a computer enclosure, comprising:
- a bracket fixedly mounted to a wall of said computer enclosure, having a first adjusting means;
- said cooling device having a second adjusting means thereby the cooling device being selectively retained at different positions with regard to the bracket by means of the cooperation of said first adjusting means and said second adjusting means; wherein
- said second adjusting means includes a plurality of slots.

* * * * *